United States Patent [19]  
Miyoshi et al.

[11] B 3,925,269  
[45] Dec. 9, 1975

[54] PHOTO-DEGRADING RESINOUS COMPOSITION

[75] Inventors: Hiroshi Miyoshi, Takatsuki; Hirohumi Mori; Yoriko Tanoue, both of Suita, all of Japan

[73] Assignee: Sekisui Kagaku Kogyo Kabushiki Kaisha, Japan

[22] Filed: Dec. 28, 1971

[21] Appl. No.: 213,211

[44] Published under the Trial Voluntary Protest Program on January 28, 1975 as document no. B 213,211.

[30] Foreign Application Priority Data
Dec. 28, 1970 Japan.............................. 45-126944
Dec. 28, 1970 Japan.............................. 45-126945

[52] U.S. Cl.... 260/2.5 B; 260/DIG. 43; 260/63 BB; 260/63 R; 260/880 R; 260/887; 260/890
[51] Int. Cl.$^2$.................... C08F 36/02; C08F 36/06; C08F 36/08; C08F 36/14
[58] Field of Search........... 260/63 R, 879, DIG. 43, 260/63 BB, 2.5 B

[56] References Cited
UNITED STATES PATENTS

| | | | |
|---|---|---|---|
| 2,374,589 | 4/1945 | Dreisbach............................. | 260/63 |
| 2,500,082 | 3/1950 | Lieber et al. ......................... | 260/63 |
| 2,897,167 | 7/1959 | Dreisbach et al..................... | 260/63 |
| 3,052,651 | 9/1962 | Sterling............................... | 260/63 |
| 3,753,952 | 8/1973 | Guillet................................ | 260/63 |

FOREIGN PATENTS OR APPLICATIONS
988,290   4/1965   United Kingdom

OTHER PUBLICATIONS
Industrial and Engineering Chemistry – Vol. 45, No. 7, 1953, pp. 1532 to 1538.

*Primary Examiner*—V. P. Hoke
*Attorney, Agent, or Firm*—Wenderoth, Lind & Ponack

[57] ABSTRACT

A photo-degrading resinous composition which comprises:
a. from 50 to 100% by weight of a copolymer composed of (i) 95.0–99.9 % by weight of a monomer selected from the group consisting of styrene and methyl methacrylate, (ii) 5.0–0.1 % by weight of a diene monomer and (iii) up to 4.9% by weight of an unsaturated ketone having the formula

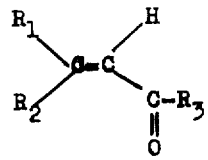

wherein $R_1$, $R_2$ and $R_3$, which may be the same or different, represent a hydrogen atom or a methyl or phenyl group, and
b. up to 50% by weight of a thermoplastic synthetic resin other than said copolymer.

10 Claims, No Drawings

PHOTO-DEGRADING RESINOUS COMPOSITION

This invention relates to a photo-degrading resinous composition which deteriorates and disintegrates readily under sun light or ultraviolet rays, and to a shaped article manufactured therefrom.

In general, when synthetic resins are left to stand under influences of nature, they are hardly deteriorated by efflorescing actions such as oxidation and ozonization or by putrefaction by microorganisms. Accordingly, synthetic resin shaped articles such as containers, bags, films, foams and the like still retain their original forms even after they become disused and discarded, making their disposal very inconvenient and cumbersome. In the present "age of plastics", synthetic resin articles are utilized in any field of modern living, and disposal of such disused plastic articles is presently a social problem.

For instance, disused plastic articles are collected together with other wastes from households and discarded rivers or fields or reclaimed lands or burnt out. These disused synthetic resin articles contained in great quantity in wastes retain their original forms for a very long time without undergoing deterioration, even after other waste materials inclusive of organic waste materials other than synthetic resin articles have deteriorated and disintegrated. This phenomenon results in various social problems such as industrial, sanitary and scenery-defiling troubles.

If waste articles of synthetic resins are collected separately from other waste articles and only synthetic resin articles are disposed of in some way or other, it includes various difficulties. For instance, collection of such waste synthetic resin articles requires much labor and time. In case they are burnt out in incinerators, black smokes or poisonous gases are inevitably generated. Further, some synthetic resins generate high temperatures when they are burnt out, which results in extreme shortening of life of incinerators.

It is an object of this invention to provide a photdegrading resinous composition which will deteriorate and disintegrate readily under influences of nature when it has disused and left outdoors and which will not bring about the above-mentioned troubles as to disposal thereof.

Another object of this invention is to provide a shaped article manufactured from such photo-degrading resinous composition.

In accordance with this invention there is provided a photo-degrading resinous composition which comprises:

a. from 50 to 100% by weight of a copolymer composed of (i) 95.0–99.9% by weight of a monomer selected from the group consisting of styrene and methyl methacrylate, (ii) 5.0–0.1% by weight of a diene monomer and (iii) up to 4.9% by weight of an unsaturated ketone having the formula

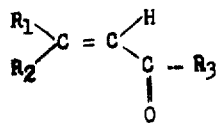

wherein $R_1$, $R_2$ and $R_3$, which may be the same or different, represent a hydrogen atom or a methyl or phenyl group, and b. up to 50% by weight of a thermoplastic synthetic resin other than said copolymer.

This invention has been achieved based on the finding that a copolymer of styrene or methyl methacrylate with a small proportion of a diene monomer readily deteriorates and disintegrates under sun light and ultraviolet rays and that when the copolymer is blended with other thermoplastic synthetic resin, the strength of the blend is extremely reduced under sun light and ultraviolet rays and it readily undergoes deterioration and disintegration.

The copolymer to be used in this invention is characterized by a diene monomer content of 0.1–5% by weight, preferably 0.5–4% by weight, especially preferably 1–3% by weight, based on the copolymer weight. At such preferable diene monomer content the phtodegrading property of the copolymer is very conspicuous.

It has been known in the art that styrene or methyl methacrylate is copolymerized with a diene monomer such as butadiene to form a copolymer thereof. However, the purpose of such conventional copolymerization is to obtain rubbery elastic materials composed of a styrene-butadiene copolymer or a methyl methacrylate-butadiene copolymer, and in these elastic materials, in general, the butadiene content is at least 10% by weight. Thus, a styrene-diene copolymer or methyl methacrylate-diene copolymer having such a low diene monomer content of 0.1–5% by weight as intended in this invention has not been taken into consideration. Unlike conventional styrene-butadiene and methyl methacrylate-butadiene copolymers, the copolymer of styrene or methyl methacrylate having such a low diene monomer content does not exhibit at all rubbery elasticity, but it still retains excellent characteristics inherent to polystyrene or poly(methyl methacrylate) with respect to strength, rigidity, hardness, transparency, etc.

Such copolymer may readily be prepared by any of conventional polymerization processes, such as suspension polymerization process, emulsion polymerization process, bulk polymerization process, etc.

As the diene monomer to be copolymerized with styrene or methyl methacrylate in the preparation of the copolymer of this invention, there may be exemplified butadiene, isoprene, chloroprene, 2,3-dichlorobutadiene and 2,3-dimethylbutadiene. Use of butadiene and isoprene is especially preferred.

In this invention, units derived from an unsaturated ketone having the following formula:

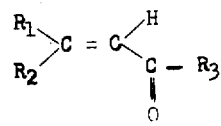

in which $R_1$, $R_2$ and $R_3$, which may be the same or different, represent a hydrogen atom or a methyl or phenyl group, may be introduced as the third copolymeric units into the above-mentioned copolymer of styrene or methyl methacrylate with a diene monomer. It has been found that the introduction of such third copolymeric units further improves the photo-degrading property of the resulting copolymer.

Specific examples of the unsaturated ketone include methyl vinyl ketone, phenyl vinyl ketone, phenyl propenyl ketone and benzalacetophenoe. Use of methyl vinyl ketone is especially preferred. Such unsaturated ketone is incorporated in an amount of up to 4.9% by weight, preferably 0.5–4% by weight, especially preferably 1–3% by weight, based on the copolymer weight.

In this invention, it is important that the total amount of the diene monomer and unsaturated ketone monomer is up to 5% by weight based on the copolymer weight. By adjusting the total amount of the diene monomer and unsaturated ketone monomer within such range, the resulting copolymer can be allowed to retain desirable characteristics inherent to polystyrene or poly(methyl methacrylate).

Even when the styrene-diene or methyl methacrylate-diene copolymer or the styrene-diene-unsaturated ketone or methyl methacrylate-diene-unsaturated ketone copolymer is used singly in this invention, it is possible to provide a resinous composition having a satisfactory photo-degrading property. Further, it is also possible to blend such copolymers with other thermoplastic synthetic resins. Also in this case, there can be obtained resinous compositions having an excellent photo-degrading property.

The kind of other thermoplastic resin to be blended into the copolymer of this invention is not particularly critical, and any of thermoplastic resins customarily used in the art may be used. Especially preferable examples of such thermoplastic resin are polystyrene, polyethylene, poly(methyl methacrylate), poly(vinyl chloride), etc. Especially when polystyrene is used, desired properties of polystyrene such as high strength, rigidity, hardness and transparency are not hardly lost but are retained in the resulting composition, and it may similarly be used in fields where polystyrene has heretofore been utilized. Accordingly, it is especially preferred to blend polystyrene into the copolymer of this invention.

It is important that such thermoplastic resin is incorporated into the copolymer in such an amount that the photo-degrading property of the copolymer is not damaged by the incorporation. The thermoplastic resin is blended in an amount of up to 50% by weight, preferably less than about 30% by weight, based on the weight of the resulting resinous composition.

The resinous blend of the copolymer of this invention with other thermoplastic resin may be prepared by a method comprising mixing the copolymer with a thermoplastic resin, and blending or melt-kneading them by suitable blending means such as a mixing roll, a Bumbury's mixer and an extrusion kneader to form a homogeneous composition. It is also possible to adopt a method comprising impregnating a monomeric mixture of styrene or methyl methacrylate and a diene monomer with a suitable thermoplastic resin such as polystyrene or dissolving the thermoplastic resin into the monomeric mixture, and effecting the polymerization.

It will readily be understood that the resinous composition of this invention may contain, in addition to the above ingredients, conventional additives to resins according to need. For instance, heat stabilizers, lubricants, fillers, pigments, plasticizers, various high molecular substances and other additives may be incorporated in the composition of this invention. Still further, ordinary foaming agents for resins or foamable substances may be incorporated into the composition of this invention according to need. As such substances there may be exemplified propane, butane, n-hexane, pentane, dichloro-difluoro-methane, azobisisobutyronitrile and azodicarbonamide. By incorporation of such substances, it is made possible to provide foam products having a multicellular structure.

The above-mentioned additives and foaming agents may be introduced into the resinous composition of this invention by customary methods adopted in the art. For instance, they may be incorporated directly in the resinous composition, or they may be incorporated into the copolymer or thermoplastic resin in advance, following which such copolymer and thermoplastic resin are blended together.

The resinous composition of this invention may readily be shaped into a photo-degrading article such as plate, sheet, film, vessel, container and tube by customary shaping means such as injection molder, extrusion molder, calender roll, inflation molder, molding press and casting molder.

Thus there are provided a resinous composition having an excellent photo-degrading property and a shaped article thereof. Thermoplastic resins usually used as plastics in various fields have a degree of polymerization ranging from about 800 to about 5000. For instance, in the case of polystyrene, when the degree of polymerization is reduced to about 500 or less, the resin becomes fragile and brittle and is readily broken or disintegrated. The resinous composition of this invention is deteriorated and disintegrated with reduction of the molecular weight, when it is exposed to sun light or ultra-violet rays. More specifically, when the resinous composition of this invention is left alone outdoors for a period of about 1 week to several months, usually 1–5 months, the resinous composition is deteriorated to such an extent that the spontaneous disintegration is allowed to occur in the composition.

Accordingly, the resinous composition and shaped article of this invention may be conveniently applied to thrownaway uses. For instance, they may be used for preparation of packing sheets, packing films, simple tablewares such as thrownaway plates, saucers and cups, agricultural films, and the like. When these articles are thrown away together with other wastes, unlike conventional synthetic resin articles, they do not defile or damage nature or environment, but they are spontaneously deteriorated and disintegrated under influences of sun light and ultra-violet rays. Accordingly, labor and time required for collection and incineration can be omitted.

This invention will now be detailed by referring to Examples, but it must be noted that the scope of the invention is not at all limited by these Examples.

EXAMPLE 1

A mixture of 320 g of styrene with 0.05 g of butadiene and 0.06 g of benzoyl peroxide was charged into a 30-cc capacity glass ampoule, and the ampoule was sealed. The polymerization was conducted by heating the mixture at 90° C. for 15 hours. The resulting polymer was taken out of the ampoule and dissolved in benzene. Methanol was added to the solution to precipitate the polymer, and the precipitate was recovered by filtration, washed with methanol, and dried in vacuo at 50° C. for 24 hours to obtain a copolymer of Run No. 1 indicated in Table 1.

Runs Nos. 2–5 were performed in the same manner as above by varying the amounts of styrene and butadiene to be copolymerized therewith, and there were obtained copolymers of Runs Nos. 2–5 indicated in Table 1.

These styrene-butadiene copolymers (10 g each) were dissolved respectively into 100 g of toluene and the solutions were formed into films of 0.1 mm thickness by the casting process. The films were subjected to irradiation of a 400 watt high pressure mercury lamp disposed 15 cm apart from the sample, and the change in the degree of polymerization brought about by conducting the irradiation for a predetermined period of time was examined.

For comparison, a film was prepared in the same manner as above from polystyrene having an average degree of polymerization of 1130, and it was subjected to irradiation in the same manner as above. The change in the degree of polymerization was determined. Results are shown in Table 1.

into films and tested in the same manner as in Example 1. Results are shown in Table 2.

Table 2

| Run No. | Isoprene content (wt. %) | Degree of polymerization before irradiation | Degree of Polymerization after Irradiation | |
|---|---|---|---|---|
| | | | after 15 hours' irradiation | after 40 hours' irradiation |
| 7 | 0.3 | 1340 | 1130 | 690 |
| 8 | 0.7 | 1650 | 1030 | 680 |
| 9 | 1.2 | 1730 | 990 | 510 |
| 10 | 2.0 | 1110 | 520 | 220 |
| 11 | 3.8 | 1130 | 370 | 210 |
| 12 | 4.8 | 1830 | 570 | 190 |
| 13 (control) | 0 | 1130 | 1080 | 890 |

EXAMPLE 3

Copolymers indicated in Table 3 were prepared in the same manner as in Example 1 by varying the amount and kind of the comonomer to be copolymerized with styrene, and they were formed into films and tested in the same manners as in Example 1. For comparison, polystyrene of a degree of polymerization of 1120 prepared by homopolymerization of styrene was similarly formed into a film and tested. Results are shown in Table 3.

Table 3

| Run No. | Copolymer Composition (weigh ratio) | Degree of Polymerization before irradiation | Degree of Polymerization after Irradiation | |
|---|---|---|---|---|
| | | | 16 hours' irradiation | 32 hours' irradiation |
| 14 | styrene-butadiene (97.6 : 2.4) | 1040 | 435 | — |
| 15 | styrene-butadiene-methyl methacrylate (97.8 : 1.1 : 1.1) | 1030 | 237 | — |
| 16 | styrene-butadiene-benzalacetophenone (96.0 : 2.0 : 2.0) | 1750 | — | 320 |
| 17 | styrene-isoprene-phenyl vinyl ketone (96.0 : 2.0 : 2.0) | 1440 | 340 | — |
| 18 (control) | polystyrene | 1120 | 1010 | — |

Table 1

| Run No. | Butadiene Content (wt. %) | Degree of Polymerization | Degree of Polymerization After Irradiation | | | |
|---|---|---|---|---|---|---|
| | | | 4 hours | 8 hours | 16 hours | 32 hours |
| 1 | 0.21 | 1260 | 1103 | 991 | 820 | 663 |
| 2 | 0.83 | 1370 | 1070 | 875 | 748 | 536 |
| 3 | 1.91 | 1150 | 755 | 605 | 440 | 315 |
| 4 | 3.28 | 2380 | 1370 | 935 | 724 | 377 |
| 5 | 4.87 | 1070 | 640 | 455 | 414 | 302 |
| 6 (control) | 0 | 1130 | 1105 | 1085 | 1050 | 910 |

EXAMPLE 2

Styrene-isoprene copolymers were prepared in the same manner as in Example 1 by employing isoprene instead of butadiene as a comonomer to be copolymerized with styrene, and these copolymers were formed

EXAMPLE 4

A mixture of 20 g of methyl methacrylate with 0.5 g of butadiene and 0.1 g of benzoyl peroxide was charged into a 30-cc capacity glass ampoule, and the ampoule was sealed. The polymerization was accomplished by heating the mixture at 90° C. for 6 hours. The resulting polymer was taken out of the ampoule and dissolved in methyl ethyl ketone. Methanol was added to the solution to precipitate the polymer. The precipitate was recovered by filtration, washed with methanol, and dried in vacuo at 50° C. for 24 hours to obtain a copolymer of Run No. 19 of Table 4.

Copolymers of Runs Nos. 20 and 21 of Table 4 were prepared in the same manner as above by changing the amount and kind of the monomer to be copolymerized with methyl methacrylate. For comparison, poly(-methyl methacrylate) having a degree of polymerization of 1560 was also prepared.

These polymers were formed into films and tested in the same manner as in Example 1. Results are shown in Table 4.

Table 4

| Run No. | Copolymer Composition (wt. %) | | | | Degree of Polymerization before Irradiation | Degree of Polymerization after Irradiation | |
|---|---|---|---|---|---|---|---|
| | methyl methacrylate | buta-diene | iso-prene | methyl vinyl ketone | | 20 hours' irradiation | 50 hours' irradiation |
| 19 | 97.8 | 2.2 | — | — | 1540 | 550 | 350 |
| 20 | 98.1 | — | 1.9 | — | 1710 | 660 | 320 |
| 21 | 97.5 | 2.0 | — | 0.5 | 2030 | 440 | 280 |
| 22 (control) | 100 | — | — | — | 1560 | 1300 | 1170 |

EXAMPLE 5

A mixture of 500 g of styrene, 1.5 g of butadiene, 1.5 g of benzoyl peroxide and 0.15 g of tert-butylperoxy benzoate was put into a 2-liter capacity autoclave charged with 500 g of a 0.5% aqueous solution of polyvinyl alcohol, and the autoclave was sealed. The atmosphere inside the autoclave was replaced by nitrogen, and the temperature was elevated under agitation to initiate the polymerization. The mixture was heated at 90°C. for 7 hours and at 110°C. for additional 2 hours. The reaction product was taken out of the autoclave, washed with water and dried. The so recovered polymeric product was dissolved in benzene, and methanol was added to the solution to precipitate a polymer. The precipitate was recovered by filtration, washed with methanol and dried in vacuo at 50° C. for 24 hours to obtain a styrene-butadiene copolymer having a butadiene content of 0.25% by weight and an average degree of polymerization of 1150.

Then, 9.5 g of the so obtained styrene-butadiene copolymer and 0.5 g of polystyrene having an average degree of polymerization of 1130 were added to 100 g of toluene to form a homogeneous solution. The solution was formed into a film of 0.1 mm thickness by the casting method.

The so formed film was subjected to irradiation of a 400 watt high pressure mercury lamp disposed 15 cm apart from the sample film. After the film had been exposed under irradiation for 32 hours, the degree of polymerization of the film was determined to be 650.

EXAMPLE 6

In the same manner as in Example 1, there was prepared a styrene-butadiene copolymer having a butadiene content of 4.87% by weight and an average degree of polymerization of 1070.

Then, 5 g of the so prepared styrene-butadiene copolymer and 5 g of polystyrene having an average degree of polymerization of 1130 were added to 100 g of toluene to form a homogeneous solution. The solution was formed into a film of 0.1 mm thickness by the casting method.

The so formed film was subjected to irradiation of a 400 watt high pressure mercury lamp disposed 15 cm apart from the sample film. After 32 hours' irradiation the degree of polymerization of the film was determined to be 454.

EXAMPLE 7

In the same manner as in Example 2, there was prepared a styrene-isoprene copolymer having an isoprene content of 3.5% by weight and an average degree of polymerization of 1310.

Then, 8 g of the so prepared copolymer and 2 g of polystyrene having an average degree of polymerization of 1130 were added to 100 g of toluene to form a homogeneous solution. The solution was formed into a film of 0.1 mm thickness by the casting method.

The film was subjected to irradiation of a 400 watt high pressure mercury lamp disposed 15 cm apart from the sample film. After 32 hours' irradiation, the degree of polymerization was determined to be 380.

EXAMPLE 8

Copolymers of Runs Nos. 19, 20 and 21 prepared in Example 4 (9 g each) were respectively blended with 1 g of poly(methyl methacrylate) of Run No. 22, and each of the blends was dissolved in 100 g of toluene, respectively. Films of 0.1 mm thickness were prepared from the so formed homogeneous solutions by the casting method. These films were subjected to irradiation of a 400 watt high pressure mercury lamp disposed 15 cm apart from the sample film. After the irradiation had been continued for a predetermined period of time, the degree of polymerization was determined. Results are shown in Table 5.

Table 5

| Run No. | Copolymer | | Poly(methyl methacrylate) | | Degree of Polymerization | | |
|---|---|---|---|---|---|---|---|
| | Kind | Content (wt. %) | Kind | Content (wt. %) | before irradiation | after 20 hours' irradiation | after 50 hours' irradiation |
| 23 | product of Run No. 19 | 90 | product of Run No. 22 | 10 | 1540 | 780 | 510 |
| 24 | product of Run No. 20 | 90 | product of Run No. 22 | 10 | 1680 | 860 | 480 |
| 25 | product of Run No. 21 | 90 | product of Run No. 22 | 10 | 1980 | 590 | 410 |

EXAMPLE 9

500 Grams of beads of a styrene-butadiene copolymer having a butadiene content of 1.9% by weight and a degree of polymerization of about 1150 were taken into a 2-liter capacity autoclave charged with 700 g of a 0.5% aqueous solution of polyvinyl alcohol, and the temperature was elevated to 50°C. under agitation. Butane gas was introduced under pressure into the autoclave, and the temperature was maintained at 50°C. for 5 hours, following which the temperature was lowered. The resulting reaction product was taken out of the autoclave, washed with water, dried, and maintained at 10°C. for 3 days. Thus there were obtained foamable beads containing butane gas. The foamable beads were molded by means of an extruder to obtain a foamed sheet of 1.5 mm thickness having a foam ratio of about 10.

When the sheet was left outdoors for 14 days, it was deteriorated to such an extent that it was crumbled away to powder only by picking it with fingers. At that time the degree of polymerization of the sheet was about 500.

EXAMPLE 10

Foamable copolymer beads impregnated with butane gas were prepared in the same manner as in Example 9 by employing a styrene-isoprene copolymer having an isoprene content of 4.8% by weight and a degree of polymerization of 2340.

The so prepared beads were taken into a mold and heated by steam to obtain a foamed article having an apparent density of 0.015. A sheet of 15 mm thickness was cut from the so obtained foamed article, and subjected for 100 hours to irradiation of a 400 watt high pressure mercury lamp disposed 30 cm apart from the sample sheet. As a result, the portion of the sheet from the irradiated surface to the interior of a depth of about 5 mm became very fragile and was crumbled away into powder only by touching it with finger tips.

For comparison, a polystyrene foamed sheet of 15 mm thickness prepared in the same manner as above from beads of polystyrene having a degree of polymerization of about 1500 was tested in the same manner as above. In this case, such extreme deterioration as described above was not caused to occur but only the surface portion of the sheet was discolored into a faintly yellow color.

EXAMPLE 11

Foamable copolymer beads impregnated with n-hexane were prepared in the same manner as in Example 9 by employing a methyl methacrylate-butadiene copolymer having a butadiene content of 3.8% by weight and a degree of polymerization of 3680. The so prepared foamable beads were taken into a mold and heated by steam to obtain a foamed article having an apparent density of 0.018. A sheet of 15 mm thickness was cut from the foamed article, and when the sheet was left outdoors for 2 months, the sheet was so deteriorated that the portion of the sheet from the surface to the interior of a depth of about 3 mm was crumbled away into powder only by touching it with finger tips.

For comparison, a foamed sheet for an apparent density of 0.018 prepared from poly(methyl methacrylate) having a degree of polymerization of 3240 was left outdoors for 2 months in the same manner as above. However, the surface portion of the sheet was hardly changed and it was not crumbled away into powder by touching it with finger tips.

EXAMPLE 12

A mixture of 6 g of a copolymer of an average degree of polymerization of 3240 composed of 95.8% by weight of methyl methacrylate, 2.2% by weight of butadiene and 2% by weight of methyl vinyl ketone and prepared in the same manner as described in Example 4, with 4 g of poly(vinyl chloride) having an average degree of polymerization of 1100 was dissolved in tetrahydrofuran, and the solution was formed into a film of 0.1 mm thickness by the casting method. The so formed film was subjected for 85 hours to irradiation of a 400 watt high pressure mercury lamp disposed 30 cm apart from the sample film. The film was very fragile, and when a bending force was imposed on the film, it was broken away.

In the same manner as above, a film of 0.1 mm thickness was prepared from a mixture of 6 g of poly(methyl methacrylate) having an average degree of polymerization of 3240 and 4 g of poly(vinyl chloride) having an average degree of polymerization of 1100, and the film was tested in the same manner as above. In order for this film to show deterioration similar to that of the above film formed according to this invention, the irradiation had to be conducted for more than 200 hours.

What we claim is:

1. A photo-degrading resinous composition which consists essentially of from 50 to 100% by weight of a copolymer composed of (i) 95.0–99.9% by weight of a monomer selected from the group consisting of styrene and methyl methacrylate, (ii) 5.0–0.1% by weight of a diene monomer and (iii) 0.5 to 4.9% by weight of an unsaturated ketone having the formula

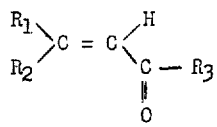

wherein $R_1$, $R_2$ and $R_3$, which may be the same or different, represent a hydrogen atom or a methyl or phenyl group.

2. A photo-degrading resinous composition as set forth in claim 1, wherein said diene is butadiene.

3. A photo-degrading resinous composition as set forth in claim 1, wherein said diene is isoprene.

4. A photo-degrading resinous composition as set forth in claim 1, wherein said unsaturated ketone is selected from the group consisting of methyl vinyl ketone, phenyl vinyl ketone, phenyl propenyl ketone and benzalacetophenone.

5. A photo-degrading resinous composition as set forth in claim 1, which further comprises a foaming agent.

6. A shaped article prepared by employing a photo-degrading resinous compositions as set forth in claim 1.

7. A shaped article as set forth in claim 6, which is a foam.

8. A shaped article as set forth in claim 6, which is a film, sheet or container.

9. A photo-degrading resinous composition as set forth in claim 1 wherein the ketone is present at 0.5 to 4% by weight.

10. A photo-degrading resinous composition as set forth in claim 1, wherein the diene monomer is selected from the group consisting of butadiene, isoprene, chloroprene, 2,3-dichlorobutadiene and 2,3-dimethylbutadiene.

* * * * *